United States Patent [19]

Talonen et al.

[11] Patent Number: 4,861,577

[45] Date of Patent: Aug. 29, 1989

[54] METHOD FOR REMOVING THE SULPHUR CONTENT OF A WEAK GAS CONTAINING SULFUR DIOXIDE

[75] Inventors: Timo T. Talonen, Nakkila; Jaakko T. I Poijärvi; Maija-Leena Metsärinta, both of Ulvila, all of Finland

[73] Assignee: Outokumpu Oy, Helsinki, Finland

[21] Appl. No.: 105,553

[22] Filed: Oct. 6, 1987

[30] Foreign Application Priority Data

Oct. 22, 1986 [FI] Finland ................... 864281

[51] Int. Cl.$^4$ ............................................. C01B 17/05
[52] U.S. Cl. .................................... 423/577; 210/761; 423/222; 423/551; 423/242; 423/571; 423/574 L
[58] Field of Search ........... 423/577, 222, 544, 574 L, 423/575, 551, 242 R, 242 A, 571; 210/761

[56] References Cited

U.S. PATENT DOCUMENTS

| | | | |
|---|---|---|---|
| 3,761,409 | 9/1973 | McCoy et al. | 210/761 |
| 3,784,680 | 1/1974 | Strong et al. | 423/577 |
| 3,932,584 | 1/1976 | Asakusa et al. | 423/577 |
| 3,959,452 | 5/1976 | Espenscheid et al. | 423/226 |
| 4,083,944 | 4/1978 | Chalmers | 423/571 |
| 4,208,395 | 6/1980 | Gorin | 423/242 A |
| 4,360,508 | 11/1982 | Farrington et al. | 423/544 |

FOREIGN PATENT DOCUMENTS

| | | | |
|---|---|---|---|
| 60621 | 10/1981 | Finland | 423/577 |
| 174223 | 10/1983 | Japan | 423/242 A |
| 592748 | 2/1978 | U.S.S.R. | 423/242 A |
| 609727 | 5/1978 | U.S.S.R. | 423/551 |
| 10147 | of 1913 | United Kingdom | 423/574 L |

*Primary Examiner*—John Doll
*Assistant Examiner*—Jeffrey Edwin Russel
*Attorney, Agent, or Firm*—Brooks Haidt Haffner & Delahunty

[57] ABSTRACT

The invention relates to a method for cleaning exhaust gases weak in sulphur dioxide, or sulphur dioxide and hydrogen sulphide. In order to remove the sulphur content of an exhaust gas, the exhaust gas is absorbed into a solution containing sulphide. Thereafter into the solution is added an agent which causes any unstable compounds of sulphur and oxygen, such as thiosulphate and polythionates, which are formed in the scrubbing solution, to decompose into elemental sulphur and sulphate in the autoclave whereinto the scrubbing solution is fed. The pH of the solution emerging from the autoclave is adjusted to stay within the range 2.0–2.9.

18 Claims, No Drawings

METHOD FOR REMOVING THE SULPHUR CONTENT OF A WEAK GAS CONTAINING SULFUR DIOXIDE

The present invention relates to a method for removing the sulphur content from weak exhaust gases containing sulphur dioxide or sulphur dioxide and hydrogen sulphide. The sulphur compounds are removed by means of sulphides so that the gas containing sulphur dioxide, or sulphur dioxide and hydrogen sulphide, is conducted into a scrubbing solution which contains metal sulphide and where also thiosulphate and other sulphur-oxygen compounds are created in addition to the metal sulphate. The scrubbing solution is fed into an autoclave, and either prior to the autoclave or directly into the autoclave there is added some suitable agent by means of which the unstable sulphur-oxygen compounds can be decomposed into sulphate and elemental sulphur.

The FI patent specification 60621 discloses a method for scrubbing concentrated exhaust gases by means of sulphides so that the sulphur is recovered as molten elemental sulphur, and the soluble sulphates created in the scrubbing are regenerated in a known fashion, by the aid of sulphides, back into sulphide form. In this method, sulphur dioxide is allowed to react in an aqueous solution with metal sulphide, according to the following reation:

$$S^{2-} + 2SO_2 \rightarrow SO_4^{2-} + 2S^0 \tag{1}$$

In practice, owing to the kinetic inertia of this reaction, also thiosulphate and some polythionates are created in addition to elemental sulphur and metal sulphate. In order to obtain a final product which essentially contains only elemental sulphur and metal sulphate, the absorption of the sulphur dioxide in the two-stage reactor system is adjusted so that into the solution emerging from the absorption stage, two moles of sulphur dioxide are absorbed per each sulphide mole fed into the solution.

According to the FI patent specification 69621, the pH value or the redox potential of the absorption solution defines how much sulphur dioxide is absorbed per each sulphide mole. The higher the sulphur dioxide/sulphide mole ratio, the lower the pH value. The pH value corresponding to the value 2 of the said ratio lies between 2.5 and 3.5, and the respective redox potential between −70 and −150 mV, depending on certain other facts which affect the said values.

According to the method described above, the reaction (1) can be made to proceed to completion by putting the absorption solution, the said mole ratio whereof is between 1.8 and 2.2, into an autoclave at a raised temperature which is between 120° and 150° C. In the autoclave, the reactions proceed to the final result according to the formula (1). The created elemental sulphur descends to the bottom of the autoclave, wherefrom it can be discharged in molten form, and the sulphate solution is discharged via the top part of the autoclave. The sulphate recovered from the autoclave is regenerated in some known fashion to sulphide, whereafter the sulphide can again be used for adjusting the scrubbing capacity of the scrubbing solution.

The described method is practicable for gases with a relatively high SO₂ content, i.e. from a few percent up to tens of percent. But it is often necessary to remove sulphur compounds also from gases with a weak sulphur content, i.e. from gases with a sulphur content of approximately one percent by volume or less. Such gases are for example the combustion gases resulting from the burning of coal and oil. While treating weak exhaust gases according to the above described method, the problem is that the pH of the scrubbing solution does not decline to sufficiently low value. If such a solution were treated in an autoclave in the circumstances described above, a large amount of the thiosulphate and other unstable intermediate products created in the scrubbing solution would be, even in the autoclave, left non-reacted as elemental sulphur and metal sulphate, according to equation (1).

According to the method of the present invention, an agent or compound is added into the scrubbing solution, by means of which agent the thiosulphate and other compounds, such as the polythionates, are made to decompose in the autoclave, so that a thermodynamic balance is achieved, and consequently essentially only sulphate and elemental sulphur are obtained from the autoclave according to the gross reaction (1). The pH value of the solution emerging from the autoclave can be considered as the indicator of the decomposition of the unstable intermediate products. The essential novel features of the invention are apparent from the patent claim 1.

The experiments performed have shown that if the thiosulphate content of the solution emerging from the autoclave should be maintained at about 1 g/l, the pH value of he sulphate solution emerging from the autoclave must be to adjusted below 2.9, and advantageously to between 2.0 and 2.9. In the experiments performed it has also been observed that when the sulphur dioxide content of a gas to be fed into the scrubbing solution is approximately 0.2% by volume, the pH of the solution obtained from the autoclave is within the range 3.5–3.8. With a SO₂ content of 1%, the pH is accordingly 3.0–3.3. When the SO₂ content of the gas is 7%, the pH of the sulphate solution obtained from the autoclave is generally 2.0–2.6, i.e. the addition of an agent for decomposing the unstable compounds is unnecessary.

A very advantageous application of the present method is to decompose the unstable sulphur compounds by means of sulphuric acid. In that case the total reaction proceeds as follows:

$$S_2O_3^{2-} + \tfrac{4}{3}H_2SO_4 \rightarrow SO_4^{2-} + 4/3S^0 + \tfrac{4}{3}H_2O \tag{2}$$

While employing sulphuric acid, the thiosulphate is disproportioned in the autoclave due to the hydrogen contained in the sulphuric acid, in which case the thiosulphate is decomposed partly into elemental sulphur and partly into sulphate.

Sulphuric acid cannot be fed into the scrubbing solution prior to the autoclave, at a standard pressure, because in that case the sulphuric acid would release some of the sulphur dioxide dissolved in the solution, thus increasing the need for acid and making it necessary to scrub the gas emerging from the reactor in question.

The advantageousness of the use of sulphuric acid is based on the fact that in practice the sulphur contained in the acid is recovered in the process as an addition to the sulphur production, and the price obtained for the sulphuric acid is formed of the production costs only. Moreover, because the sulphuric acid is in liquid form, it is easily fed into an autoclave, too.

An advantageous alternative for decomposing the unstable sulphur compounds is to add some sulphur dioxide into the absorption solution before feeding the solution into the autoclave. Owing to the effect of SO$_2$, the decomposition reaction of for example thiosulphate proceeds as follows:

$$S_2O_3^{2-} + \tfrac{1}{2}SO_2 \rightarrow SO_4^{2-} + 3/2 S^0 \qquad (3)$$

At the absorption stage, into the solution is absorbed sulphur dioxide, the oxygen whereof is sufficient for forming the sulphate for only a part of the metal (cation) fed into the solution in sulphide form. If an addition of sulphur dioxide is now supplied into the autoclave, stoichiometrically in proportion to the amount of remaining metal, the sulphate created at the absorption stage and the sulphate formed by means of concentrated sulphur dioxide, together correspond stoichiometrically to the solution metal and to the small amount of free sulphuric acid. Consequently all of the sulphur which in the solution surpasses the amount pertaining to the sulphate is changed into elemental sulphur.

The addition can be supplied for example so that a gas with a SO$_2$ content higher than that of the exhaust gas to be scrubbed is allowed to react with the scrubbing solution in a reactor particularly designed for this purpose. The gas containing sulphur dioxide can be brought from outside the gas scrubbing process, but the gas can also be created by burning part of the sulphur formed in the process in question.

If the sulphur dioxide gas employed in the additional treatment of the solution is concentrated, such as for example mere sulphur dioxide or the gas created in the burning of sulphur or a sulphide mineral, this concentrated gas can be added into the absorption solution simply by means of bubbling, i.e. by conducting the gas into he solution by means of a pipe or a nozzle and thus into the said reactor.

The conditions in the scrubbing solution can likewise be adjusted only inside the autoclave, by feeding oxygen thereto, either in the form of technical oxygen or air. The oxygen pressure required by the dissolution of the oxygen must be taken care of by adjusting the pressure in the autoclave to a sufficiently high level. In practice the total pressure within the autoclave is then the pressure of the water vapour + the partial pressure of oxygen. A suitable partial pressure for oxygen falls within the range 0.5-5 bar(abs), and because the temperature suitable for decomposition is between 120° and 200° C., the total pressure can be calculated from these facts. If air is used in the oxidation, the partial pressure of nitrogen must also be taken into account while defining the total pressure. When oxygen is used, the following total reaction takes place in the autoclave:

$$S_2O_3^{2-} + \tfrac{1}{2}O_2 \rightarrow SO_4^{2-} + S^0 \qquad (4)$$

Generally the temperature in the autoclave is maintained between 120° and 150° C., but sometimes it is advantageous to use a higher temperature, particularly if a remarkable amount of other compounds, such as polythionates, are created in the scrubbing solution in addition to thiosulphate. It has been observed that the polythionates in particular are decomposed more rapidly and more completely at temperatures higher than those stated above, for example near 200° C.

The above described reaction equations (2)-(4) illustrate the total reactions of thiosulphate, but it is clear that also the other sulphur and oxygen compounds, such as polythionates, created in the solution at the absorption stage, are oxidized or decomposed in he autoclave. However, it seems unnecessary to give a detailed description of the reactions in the case of each separate polythionate.

The most widely used sulphide in the scrubbing solution is sodium sulphide, but other sulphides can also be used. The regeneration of a corresponding sulphate created in the autoclave, such as sodium sulphate, is carried out in a known fashion, for example by means of barium sulphide. The barium sulphate created in the regeneration can in turn be reduced into sulphide for example by means of carbon or hydrocarbon.

The invention is further illustrated by means of the following examples.

EXAMPLE 1

A gas scrubbing was performed in a pilot plant scale, the sulphur content of the entering exhaust gases being 0.2% by volume. The scrubbing was carried out in two stages in the countercurrent direction. The scrubbing solution of the first tower was conducted into a 400 l autoclave continuously for 22 hours at the rate of 100 l/h. The temperature in the autoclave was 146° C., and the delay time of the solution was 2 h. Concentrated sulphur dioxide was supplied into the autoclave so that the pH of the solution emerging from the autoclave was between 2.5 and 2.7. The autoclave was heated by means of direct vapour. The created elemental sulphur descended to the bottom of the autoclave. The table below shows that the thiosulphate content of the solution was essentially reduced owing to the influence of sulphur dioxide.

|  | Na | SO$_4$ g/l | S$_2$O$_3$ | pH |
|---|---|---|---|---|
| before | 29.8 | 27.1 | 37.0 | 3.6 |
| after | 27.8 | 61.2 | 2.3 | 2.6 |

EXAMPLE 2

In a pilot plant scale run of gas scrubbing, 1.5 l of the scrubbing solution from the first scrubbing tower—the pH whereof was too high for the autoclave as such, because the sulphur dioxide content of the gas to be cleaned was only 0.2%—was put into the autoclave for the duration of one hour. The temperature in the autoclave was 150° C., and the partial pressure of oxygen was maintained at 2 bar(abs) during the whole experiment. The created elemental sulphur was separated from the solution by filtering. The composition of the solution before and after the autoclave treatment was as follows:

|  | Na | SO$_4$ g/l | S$_2$O$_3$ | pH |
|---|---|---|---|---|
| start | 41 | 43 | 39 | 3.8 |
| 1 h | 40.5 | 97 | <0.4 | 2.2 |

EXAMPLE 3

In a pilot plant scale run, 1.5 l of the scrubbing solution from the second scrubbing tower, the SO$_2$ content whereof was 0.2%, was put into the autoclave for the duration of 1.5 h. The pH of the scrubbing solution was 3.7. The temperature in the autoclave was 150° C., and the partial pressure of air was 7.5 bar(abs) for the duration of the whole experiment. The created elemental sulphur was separated by filtering. The composition of the solution before and after the autoclave was as follows:

|  | Na | SO$_4$ g/l | S$_2$O$_3$ | pH |
|---|---|---|---|---|
| start | 26.6 | 21 | 36 | 3.7 |
| 1.5 h | 26 | 63 | 0.9 | 2.2 |

EXAMPLE 4

The scrubbing solution from the trial run of in Example 1 was continuously conducted into the autoclave at the rate of 185 l/h. The temperature in the autoclave was 144° C., and the delay time of the solution in the autoclave was 1.1 h. Sulphuric acid was conducted into the autoclave so that the pH of the solution emerging from the autoclave was maintained between 2.7 and 2.8. The created elemental sulphur was separated to the bottom of the autoclave. The average composition of the solution before and after the autoclave was as follows:

|  | Na | SO$_4$ g/l | S$_2$O$_3$ | pH |
|---|---|---|---|---|
| before | 37.7 | 10.0 | 70.0 | 4.6 |
| after | 31.0 | 63.0 | 1.3 | 2.8 |

What is claimed is:

1. A method for removing the sulphur content of exhaust gases which contain sulphur dioxide or sulphur dioxide and hydrogen sulphide, the sulphur dioxide content of the exhaust gases being about 1% or less by volume, comprising:
   (A) absorbing the gas into a scrubbing solution containing sulphide,
   (B) conducting said scrubbing solution into an autoclave under reaction conditions and at a temperature in the range of 120° C. to 200° C.,
   (C) feeding into said scrubbing solution, either while said scrubbing solution is in said autoclave or before said scrubbing solution is conducted into said autoclave, an agent for decomposing in the autoclave any unstable compounds of sulphur and oxygen, including thiosulphate and polythionates, formed in the scrubbing solution during the absorbing step (A), and
   (D) recovering from the autoclave after reaction a product consisting essentially of elemental sulphur and a sulphate solution;
   said agent causing the pH of the sulphate solution to be within the range of 2.0 to 2.9.

2. The method of claim 1, whereina the agent is fed into the scrubbing solution in the autoclave.

3. The method of claim 2 wherein the agent fed into the scrubbing solution is sulphuric acid.

4. The method of claims 1 or 2 wherein the agent fed into the scrubbing solution is oxygen.

5. The method of claim 1 wherein the agent fed into the scrubbing solution is air.

6. The method of claim 1, wherein the agent fed into the scrubbing solution is mixed into the solution prior to conducting the solution into the autoclave.

7. The method of claim 1, wherein the agent fed into the scrubbing solution is sulphur dioxide.

8. A method according to claim 1 wherein the absorbing of the gas into the scrubbing solution containing sulphide is such that the scrubbing solution contains at a maximum 70 g/l thiosulphate.

9. A method according to claim 8 wherein the sulphide is sodium sulphide.

10. A method according to claims 1 or 8 wherein said agent causes the thiosulphate concentration of said sulphate solution to be no greater than 1 g/l.

11. A method for removing the sulphur content of exhaust gases which contain sulphur dioxide or sulphur dioxide and hydrogen sulphide, the sulphur dioxide content of the exhaust gases being about 1% or less by volume, consisting essentially of the steps:
   (A) absorbing the gas into a scrubbing solution containing sulphide such that the scrubbing solution contains at a maximum 70 g/l thiosulphate,
   (B) conducting said scrubbing solution into an autoclave under reaction conditions and at a temperature in the range of 120° C. to 200° C.,
   (C) feeding into said scrubbing solution, either while said scrubbing solution is in said autoclave or before said scrubbing solution is conducted into said autoclave, an agent for decomposing in the autoclave any unstable compounds of sulphur and oxygen, including thiosulphate and polythionates, formed in the scrubbing solution during the absorbing step (A), and
   (D) recovering from the autoclave after reaction a product consisting essentially of elemental sulphur and a sulphate solution;
   said agent causing the pH of the sulphate solution to be within the range of 2.0 to 2.9 and the thiosulphate concentration of said sulphate solution to be no greater than 1 g/l.

12. A method according to claim 11 wherein the agent is fed into the scrubbing solution in the autoclave.

13. A method according to claim 11 wherein the agent fed into the scrubbing solution is sulphuric acid.

14. A method according to claims 11 or 12 wherein the agent fed into the scrubbing solution is oxygen.

15. A method according to claim 11 wherein the agent fed into the scrubbing solution is air.

16. A method according to claim 11 wherein the agent fed into the scrubbing solution is mixed into the solution prior to conducting the solution into the autoclave.

17. A method according to claims 11, 12 or 16 wherein the agent fed into the scrubbing solution is sulphur dioxide.

18. A method according to claim 11 wherein the sulphide is sodium sulphide.

* * * * *

UNITED STATES PATENT AND TRADEMARK OFFICE
CERTIFICATE OF CORRECTION

PATENT NO. : 4,861,577
DATED : August 29, 1989
INVENTOR(S) : Timo T. Talonen et al It is certified that error appears in the above-identified patent and that said Letters Patent is hereby corrected as shown below:

Column 1, line 28:

last word "reation" should read --reaction--.

Column 2, line 30:

"value of he" should read --value of the--.

Column 3, line 36:

"into he" should read --into the--.

Column 5, line 59:

"whereina the agent" should read --wherein the agent--.

Signed and Sealed this

Seventeenth Day of December, 1991

*Attest:*

HARRY F. MANBECK, JR.

*Attesting Officer*      *Commissioner of Patents and Trademarks*